United States Patent
Uno et al.

(10) Patent No.: US 6,821,703 B2
(45) Date of Patent: Nov. 23, 2004

(54) METHOD FOR PRODUCING POLYESTER RESIN PARTICLE DISPERSION MATERIAL, METHOD FOR PRODUCING POLYESTER RESIN PARTICLES, AND METHOD FOR PRODUCING ELECTROPHOTOGRAPHIC SPHERICAL TONER

(75) Inventors: Seiichi Uno, Ichihara (JP); Nobuyoshi Shirai, Kawasaki (JP); Hideki Watanabe, Yotsukaidou (JP); Takayuki Kanematsu, Sakura (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/983,350

(22) Filed: Oct. 24, 2001

(65) Prior Publication Data

US 2002/0076639 A1 Jun. 20, 2002

(30) Foreign Application Priority Data

Oct. 27, 2000 (JP) ........................................ 2000-328684

(51) Int. Cl.$^7$ .............................................. G03G 9/087
(52) U.S. Cl. .............................. 430/137.19; 430/109.4; 430/110.3; 523/223
(58) Field of Search ........................... 430/110.3, 109.4, 430/111.4, 137.1, 137.19, 137.2; 523/223, 332; 524/601; 526/354, 359; 528/354, 359

(56) References Cited

U.S. PATENT DOCUMENTS

| | | | |
|---|---|---|---|
| 5,294,682 A | * | 3/1994 | Fukuda et al. ........... 430/109.2 |
| 5,686,218 A | | 11/1997 | Liebermann et al. |
| 5,843,614 A | * | 12/1998 | Shinzo et al. .......... 430/137.19 |
| 5,866,290 A | | 2/1999 | Sacripante et al. |
| 6,042,983 A | * | 3/2000 | Tavernier et al. ........ 430/109.4 |

FOREIGN PATENT DOCUMENTS

| JP | 9-325518 | * 12/1997 |
|---|---|---|
| JP | 2000-191892 | 7/2000 |

OTHER PUBLICATIONS

Derwent Machine–Assisted English–Language Translation of JP 2000–191892–A (pub. Jul. 11, 2000).*
Derwent Machine–Assisted English–Language Translation of JP 9–325518 (pub 12/97), Dec. 1997.*
USPTO Trademark Electronic Search System (TESS) Search Result for the Trademark Shodex.*

* cited by examiner

*Primary Examiner*—Janis L. Dote
(74) *Attorney, Agent, or Firm*—Armstrong, Kratz, Quintos, Hanson & Brooks, LLP (57) ABSTRACT

A polyester resin particle dispersion material, in which the average particle size can be easily controlled within a broad range and is less likely to form irregular particles, and which is also suited for use in adhesives, is produced by dispersing a resin melt containing, as an essential component, a polyester resin (A) having a terminal structure in which an alkyl group having 4 to 20 carbon atoms or an alkenyl group having 4 to 20 carbon atoms is bonded to a carbon atom to which a carboxyl group is attached, or a carbon atom adjacent to this carbon atom, a portion or all of carboxyl groups in the polyester resin (A) being neutralized with a basic compound, in a heated aqueous medium in a melted state, and cooling the dispersed resin melt.

13 Claims, 3 Drawing Sheets

METHOD FOR PRODUCING POLYESTER RESIN PARTICLE DISPERSION MATERIAL, METHOD FOR PRODUCING POLYESTER RESIN PARTICLES, AND METHOD FOR PRODUCING ELECTROPHOTOGRAPHIC SPHERICAL TONER

BACKGROUND OF THE INVENTION

1. Field of the Invention

The present invention relates to a method for producing a polyester resin particle dispersion material, a method for producing polyester resin particles and a method for producing an electrophotographic spherical toner. More particularly, the present invention relates to a method for producing a polyester resin particle dispersion material, a method for producing polyester resin particles and a method for producing an electrophotographic spherical toner, in which the average particle size can be easily controlled within a broad range and is less likely to form irregular particles such as string-shaped particles, and which is also suited for use in adhesives such as hot-melt adhesive.

2. Description of Related Art

As a method for producing polyester resin particles or an aqueous dispersion material thereof without using an emulsifier, for example, a method of dispersing a colored resin melt comprising a polyester resin having a carboxyl group and a colorant in an aqueous medium containing a basic compound to form an aqueous dispersion material in a melted state, and cooling and drying the aqueous dispersion material is disclosed in Japanese Unexamined Patent Application, First Publication No. Hei 9-311502, while a method of dispersing a melt of a polyester resin having a carboxyl group, which is obtained by polymerizing a polyhydric alcohol and a polyhydric carboxylic acid with a compound having an alkyl group and an epoxy group, in an aqueous medium containing a neutralizer in a melted state to form an aqueous dispersion material is disclosed in Japanese Unexamined Patent Application, First Publication No. 2000-191892.

Although resin particles containing a relatively large amount of spherical particles are obtained when using a non-branched linear polyester resin according to these methods, the resin particles must be classified when used as a toner because of broad particle size distribution. When using a branched polyester resin to obtain particles for am adhesive having excellent adhesive strength and water resistance and a toner having excellent fixation properties at low temperatures and anti-offset properties, toner particles, among which there are a large number of irregular particles such as string-shaped particles, are likely to be produced. Therefore, the solid content of the dispersion material must be reduced to 20% by weight, thereby causing a problem that the production efficiency is lowered. Moreover, according to these methods, it is not easy to control the average particle size of the polyester resin and to arbitrarily set the average particle size of the polyester resin particles within a broad range from 0.05 to 500 $\mu$m.

BRIEF SUMMARY OF THE INVENTION

An object of the present invention is to provide a method for producing a polyester resin particle dispersion material composed of spherical polyester resin particles and a method for producing polyester resin particles, which can easily control an average particle size within a broad range and is less likely to form irregular particles such as string-shaped particles, and a method for producing an electrophotographic spherical toner, which can easily control an average particle size within a broad range and is less likely to form irregular particles such as string-shaped particles, and which is also superior in fluidity and durability and is capable of producing toner particles having a narrow particle size distribution.

As a result of diligent research, the present inventors have found that, when using, as a polyester resin having a carboxyl group, a polyester resin (A) having a terminal structure in which an alkyl group having 4 to 20 carbon atoms or an alkenyl group having 4 to 20 carbon atoms is bonded to a carbon atom to which a carboxyl group is attached, or a carbon atom adjacent to this carbon atom, in the case of producing a polyester resin particle dispersion material or an electrophotographic spherical toner by dispersing a melt of a polyester resin having a carboxyl group described in Japanese Unexamined Patent Application, First Publication No Hei 9-311502 or Japanese Unexamined Patent Application, First Publication No. 2000-191892 in an aqueous medium containing a basic compound in a melted state, it is made possible to obtain a polyester resin particle dispersion material composed of spherical polyester resin particles having a narrow particle size distribution, which can easily control an average particle size within a broad range and is less likely to form irregular particles such as string-shaped particles, and which is also suited for use in adhesives such as hot-melt adhesives even if the polyester resin (A) is a linear polyester resin or a branched polyester resin and the dispersion material has a high solid content. Also, we have found that when using the polyester resin (A) in combination with a colorant (B) and using a branched polyester resin as the polyester resin (A), it is made possible to obtain an electrophotographic spherical toner, which can easily control an average particle size within a broad range and is less likely to form irregular particles such as string-shaped particles, and which is also superior in fluidity and durability and is capable of producing toner particles having a narrow particle size distribution. Thus, the present invention has been completed.

The present invention provides a method for producing a polyester resin particle dispersion material, which comprises dispersing a resin melt containing, as an essential component, a polyester resin (A) having a terminal structure in which an alkyl group having 4 to 20 carbon atoms or an alkenyl group having 4 to 20 carbon atoms is bonded to a carbon atom to which a carboxyl group is attached, or a carbon atom adjacent to this carbon atom, a portion or all of the carboxyl groups in the polyester resin (A) being neutralized with a basic compound, in a heated aqueous medium in a melted state, and cooling the dispersed resin melt.

The present invention also provides a method for producing polyester resin particles, which comprises producing a polyester resin particle dispersion material by the method, and drying the polyester resin particle dispersion material.

The present invention also provides a method for producing an electrophotographic spherical toner, which comprises dispersing a resin melt containing, as an essential component, a polyester resin (A) having a terminal structure in which an alkyl group having 4 to 20 carbon atoms or an alkenyl group having 4 to 20 carbon atoms is bonded to a carbon atom to which a carboxyl group is attached, or a carbon atom adjacent to this carbon atom and a colorant (B), a portion or all of carboxyl groups in the polyester resin (A) being neutralized with a basic compound, in a heated aqueous medium in a melted state, and cooling and drying the dispersed resin melt.

According to the method for producing a polyester resin particle dispersion material and the method for producing polyester resin particles of the present invention, it is made possible to easily control the average particle size within a broad range and to easily produce a dispersion material composed of spherical polyester resin particles with fewer irregular particles such as string-shaped particles. Also, according to the method for producing an electrophotographic spherical toner of the present invention, it is made possible to easily control the average particle size within a broad range and to efficiently produce toner particles with fewer irregular particles such as string-shaped particles, which are superior in fluidity and durability and have a narrow particle size distribution.

DETAILED DESCRIPTION OF THE INVENTION

The present invention will now be described in detail.

The polyester resin (A) used in the present invention is not specifically limited as long as it is a polyester resin in which an alkyl group having 4 to 20 carbon atoms or an alkenyl group having 4 to 20 carbon atoms is bonded to a carbon atom to which a carboxyl group is attached, or a carbon atom adjacent to this carbon atom. In the case in which polyester resin and a dispersion material thereof, which are suited for use in adhesives, are produced, a weight-average molecular weight (Mw) as measured by a GPC (gel permeation chromatography) method using a polystyrene standard of the polyester resin (A) is within a range from 10,000 to 1,000,000, and preferably from 10,000 to 500,000. In the case in which an electrophotographic spherical toner is produced, a weight-average molecular weight of the polyester resin (A) is preferably within a range from 10,000 to 500,000. In the case in which a color toner is produced, the weight-average molecular weight (Mw) is preferably within a range from 10,000 to 300,000.

Examples of the alkyl group having 4 to 20 carbon atoms and the alkenyl group having 4 to 20 carbon atoms include a butyl group, isobutyl group, sec-butyl group, tert-butyl group, n-butenyl group, isobutenyl group, n-pentyl group, neopentyl group, n-hexyl group, n-heptyl group, n-octyl group, isooctyl group, n-octyl group, isooctyl group, n-octenyl group, 2-ethylhexyl group, n-dodecyl group, isododecyl group, n-dodecenyl group, and isododecenyl group. These alkyl or alkenyl groups may be either linear or branched.

To improve the dispersion stability of the polyester resin (A) in the aqueous medium, it is necessary to have a carboxyl group to be neutralized with a basic compound. The acid value is preferably within a range from 5 to 100 mg KOH/g, more preferably from 7 to 70 mg KOH/g, and most preferably from 10 to 50 mg KOH/g, because spherical particles are easily produced and the resulting toner have a good charge characteristics. From the same point of view, the hydroxyl value of the polyester resin (A) is preferably within a range from 5 to 100 mg KOH/g, and more preferably from 7 to 70 mg KOH/g.

Furthermore, the polyester resin (A) is preferably a branched polyester resin because resin particles having excellent adhesive strength and durability as well as an electrophotographic spherical toner having excellent fixation properties at low temperatures and anti-offset properties can be obtained.

The polyester resin (A) used in the present invention preferably has a temperature capable of achieving a melt viscosity of $1 \times 10^4$ Pa.s (hereinafter referred to as "T4") within a range from 80 to 160° C., and particularly preferably from 90 to 140° C., because resin particles having excellent adhesion at low temperatures and heat resistance can be obtained in the preparation of polyester resin particles and a dispersion material thereof. For the same reason, it preferably has a glass transition temperature (hereinafter abbreviated as "Tg") as measured by differential scanning calorimetry (hereinafter abbreviated as "DSC") within a range from 40 to 100° C., and particularly preferably from 50 to The polyester resin (A) used in the present invention preferably has Tg within a range from 50 to 80° C, and more preferably from 55 to 75° C., because a toner having good heat storage stability can be obtained. In view of the same point of view, the softening temperature of the polyester resin (A) is preferably within a range from 70 to 170° C., and particularly preferably from 80 to 150° C.

The method for producing a polyester resin (A) used in the present invention is not specifically limited, but is preferably a method of previously polymerizing a polybasic acid such as dicarboxylic acid and an anhydride thereof or polybasic acid salts such as lower alkyl esters thereof with polyhydric alcohols such as diol, and preferably a dibasic acid and a dihydric alcohol as an essential component, to produce a polyester resin (a) having a hydroxyl group at a terminal and performing the ring opening reaction of an acid anhydride having a $C_{4-20}$ alkyl group and $C_{4-20}$ an alkenyl group (hereinafter abbreviated as "acid anhydride having an alkyl or alkenyl group") with a terminal hydroxyl group.

In the case in which the polyester resin (A) is a branched polyester resin, the method for producing the same is preferably a method of previously polymerizing a dibasic acid, a dihydric alcohol and a polybasic acid having a valence of three or more and/or a polyhydric alcohol having a valence of three or more to produce a branched polyester resin (a1) having a hydroxyl group at a terminal and performing the ring opening addition reaction of an acid anhydride having an alkyl or alkenyl group with a terminal hydroxyl group. As the polybasic acid having a valence of three or more and/or the polyhydric alcohol having a valence of three or more, any polybasic acid having a valence of three or more and/or polyhydric alcohol having a valence of three or more, which are described hereinafter as raw materials of the polyester resin (a1), can be used. Among these, a polybasic acid having a valence of three or four and/or a polyhydric alcohol having a valence of three or four are preferable, and a polybasic acid having a valence of three and/or a polyhydric alcohol having a valence of three are particularly preferable. The amount of the polybasic acid having a valence of three and/or the polyhydric alcohol having a valence of three is preferably within a range from 2 to 20 mols based on 100 mols of the sum total of raw components used in the preparation of the branched polyester resin (sum total of the acid component and the alcohol component).

As the apparatus used in the polymerization of the polyester resin (A), a batch type manufacturing apparatus such as a reaction vessel equipped with a nitrogen gas introducing tube, a thermometer, a stirrer, and a rectifying column can be preferably used, and an extruder equipped with a deaeration port, a continuous apparatus and a kneader can also be used. If necessary, the esterification reaction can be accelerated by appropriately evacuating the reaction system. Conventionally known catalysts can also be added to accelerate the esterification reaction.

Examples of the acid anhydride having an alkyl or alkenyl group include n-dodecenylphthalic anhydride, isodecenylphthalic anhydride, n-dodecylphthalic anhydride, isododecylphthalic anhydride, n-octylphthalic anhydride, n-octenylphthalic anhydride, n-butenylphthalic anhydride, isobutenylphthalic anhydride, n-butylphthalic anhydride, isobutylphthalic anhydride; n-dodecenylmaleic anhydride, isodecenylmaleic anhydride, n-dodecylmaleic anhydride, isododecylmaleic anhydride, n-octylmaleic anhydride, n-octenylmaleic anhydride, n-butenylmaleic anhydride, isobutenylmaleic anhydride, n-butylmaleic anhydride, isobutylmaleic anhydride; n-dodecenylsuccinic anhydride, isodecenylsuccinic anhydride, n-dodecylsuccinic anhydride, isododecylsuccinic anhydride, n-octylsuccinic anhydride, n-octenylsuccinic anhydride, n-butenylsuccinic anhydride, isobutenylsuccinic anhydride, n-butylsuccinic anhydride, and isobutylsuccinic anhydride. Among these acid anhydrides, succinc anhydride having a $C_{4-20}$ alkyl group or a $C_{4-20}$ alkenyl group is preferable, and n-dodecenylsuccinic anhydride, isododecenylsuccinic anhydride, n-dodecylsuccinic anhydride and isododecylsuccinic anhydride are particularly preferable.

The amount of the acid anhydride having an alkyl or alkenyl group used in the preparation of the polyester resin (A) is not specifically limited, but is preferably within a range from 0.1 to 20 parts by weight, and particularly preferably from 1 to 10 parts by weight, based on 100 parts by weight of the polyester resin (a) or (a1) having a hydroxyl group at a terminal, because the polyester resin (A) is easily produced.

Examples of the polybasic acids used in the preparation of the polyester resin (a) or (a1) having a hydroxyl group at a terminal include aliphatic dibasic acids and anhydrides thereof, such as maleic acid, maleic anhydride, fumaric acid, itaconic acid, itaconic anhydride, oxalic acid, malonic acid, succinic acid, succinic anhydride, n-dedecenylsucconic acid and an anhydride thereof, isododecenylsucconic acid and an anhydride thereof, n-octylsuccinic acid and an anhydride thereof, n-octynylsuccinic acid and an anhydride thereof, n-butylsuccinic acid and an anhydride thereof, adipic acid, azelaic acid, sebacic acid, and decane-1,10-dicarboxylic acid; and aromatic or alicyclic dibasic acids or anhydrides thereof, such as phthalic acid, phthalic anhydride, tetrahydrophtalic acid and an anhydride thereof, hexahydrophthalic acid and an anhydride thereof, tetrabromophthalic acid and an anhydride thereof, tetrachloroophthalic acid and an anhydride thereof, Het acid and an anhydride thereof, himic acid and an anhydride thereof, isophthalic acid, terephthalic acid, cyclohexanedicarboxylic acid, and 2,6-naphthalenedicarboxylic acid.

As one of tri or higher functional raw components, carboxylic acid having three or more carboxyl groups in a molecule and a reactive derivative thereof can also be used. Typical examples thereof include trimellitic acid, trimellitic anhydride, methylcyclohexenetricarboxylic acid, methylcyclohexenetricarboxylic anhydride, pyromellitic acid, and pyromellitic anhydride.

These polybasic acids may be used alone or in combination.

Polybasic acids in which a portion or all of the carboxyl groups are substituted with an alkyl ester, an alkenyl ester, or an aryl ester can also be used.

Furthermore, monobasic acids such as stearic acid, benzoic acid, p-tert-butylbenzoic acid and coconut fatty acid can also be used in combination as long as the effect of the present invention is not adversely affected.

Typical examples of the polyhydric alcohols include aliphatic diols such as ethylene glycol, 1,2-propylene glycol, 1,4-butanediol, 1,5-pentanediol, 1,6-hexanediol, diethylene glycol, dipropylene glycol, triethylene glycol, and neopentyl glycol; alkylene oxide adducts of bisphenol A, such as ethylene, oxide adduct of bisphenol A and propylene oxide adduct of bisphenol A; aralkylene glycol such as xylylene diglycol; and alicyclic diols such as cyclohexanedimethanol and hydrogenated bisphenol A.

Monoepoxy compounds such as compounds sold under the trademark "CARDURA E10" [monoglycidyl ester of branched fatty acid, manufactured by Shell Chemicals] can also be used as these polyhydric alcohols.

As one of tri or higher functional raw components, a compound having three or more hydroxyl groups in a molecule can also be used and typical examples thereof include glycerin, trimethylolethane, trimethylolpropane, sorbitol, 1,2,3,6-hexanetetrol, 1,4-sorbitan, pentaerythritol, dipentaerythritol, 2-methylpropanetriol, 1,3,5-trihydroxybenzene, and tris(2-hydroxyethyl)isocyanurate.

The following polypoxy compounds can also be used as tri or higher functional alcohols and examples thereof include polyglycidyl ethers of various aliphatic or alicyclic polyols such as ethylene glycol, hexanediol, neopentyl glycol, trimethylolpropane, trimethylolethane, glycerin, pentarythritol, sorbitol, and hydrogenated bisphenol A; polyglycidyl ethers of various compounds having two phenolic hydroxyl groups such as hydroquinone, catechol, resorcin, bisphenol A, bisphenol S, and bisphenol F; diglycidyl ethers of derivative such as ethylene oxide and propylene oxide of the compounds having two hydroxyl groups; polyglycidyl ethers of various polyether polyols such as polyethylene glycol, polypropylene glycol, and polytetramethylene glycol; polyglycidyl ethers of tris(2-hydroxyethyl)isocyanurate; polyglycidyl esters of various aliphatic and aromatic polycarboxylic acids such as adipic acid, butanetetracarboxylic acid, propanetricarboxylic acid, phthalic acid, teraphthalic acid, and trimellitic acid; bisepoxides of various hydrocarbon dienes such as butadiene, hexadiene, octadiene, dodecadiene, cyclooctadiene, α-pinene, and vinylcyclohexene; various alicyclic polyepoxy compounds such as bis(3,4-epoxycyclohexylmethyl)adipate and 3,4-epoxycyclohexylmethyl-3,4-epoxycyclohexylcarboxylate; epoxidated compounds of various diene polymers such as polybutadiene and polyisoprene; and compounds sold under the trademark "EGM-400" (cyclic polysiloxane having a 3-glycidoxypropyl group, manufactured by DOW CORNING TORAY SILICONE CO., LTD.).

Compounds having a hydroxyl group and a carboxyl group in a molecule, such as dimethylolpropionic acid, dimethylolbutanoic acid and 6-hydroxyhexanoic acid, or reactive derivatives thereof can also be used as polyhydric alcohols.

These polyhydric alcohols can be used alone or in combination.

Monoalcohols such a n-butyl alcohol, benzyl alcohol and cyclohexanol can also be used in combination as long as the effect of the present invention is not adversely affected.

Among the polyhydric alcohols (c), bisophenols and alkylene oxide adducts thereof, which are endocrine disruptors and are likely to exert an adverse influence on the environment, are not preferably used.

Examples of the colorant (B), which can be employed in the preparation of the electrophotographic spherical toner of the present invention, include various pigments and dyes. Among these, pigments are particularly preferable. Magnetic materials can also be used as the colorant (B).

Examples of the pigment include Hansa Yellow 10G, Hansa Yellow G, Bendizine Yellow G, Bendizine Yellow GR, Permanent Orange, Lithol Fast Orange 3GR, Permanent Orange GTR, Vulcan Fast Orange GG, Permanent Red 4R, Fire Red, p-chloro-o-nitro Aniline Red, Brillant Fast Scarlet, Brillant Carmine BS, Pyrazolone Red, Lithol Red, Lake Red C, Lake Red D, Brilliant Scarlet G, Permanent Red F5R, Brilliant Carmine 6B, Pigment Scarlet 3B, Rhodamine Lake (Fanal Color), Arisaline Lake, Toluidine Maroon, Permanent Bordeaux F2R, Helio Bordeaux BL, Bordeaux 10B, BON Maroon Light, BON Maroon Medium, Thioindigo Maroon, Perylene Red, Permanent Red BL, Permanent Pink E (FH) as quinacridone pigment, Phthalocyanine Blue, Fast Sky Blue, Indanthrene Blue RS, Pigment Green B, Naphthol Green B, Green Gold, Phthalocyanine Green, Naphthol Yellow S Lake, Quinoline Yellow Lake, Persian Orange, Peacock Blue Lake, Acid Gren Lake, Para Red, Bordeaux 5B, Alkali Blue Toner Aniline Black, and Carbon black.

Examples of the magnetic material, which can be used as the colorant (B), include triiron tetroxide, γ-iron oxide, various ferrite powders, and iron powder.

In the preparation method of the present invention, a resin melt containing the polyester resin (A) or the polyester resin (A) and the colorant (B) as an essential component may be produced by melt-kneading these components using a pressure kneader, heating-type three-roll mill, twin screw extruder or the like.

In the preparation of polyester resin particles and a dispersant thereof, which are suited for use in adhesives such as hot melt adhesive, other resin components, humectants and dispersion auxiliaries can be mixed during the melt kneading. In the preparation of the electrophotographic spherical toner, charge control agents for controlling charge characteristics and releasants for improving anti-offset properties can be mixed during the melt kneading.

The charge control agent may be either a low-molecular compound or a high-molecular compound as long as it can control charge characteristics and typical examples thereof include nigrosine dye, quaternary ammonium compound, homopolymer or copolymer of amino group compound, organometallic complex, and chelete compound.

Examples of the releasant include various known waxes for improving the anti-offset properties. Specific examples thereof include polypropylene wax, polyethylene wax, polyamide wax, Fischer-Tropsch wax, synthetic ester wax, and various natural waxes. Among these waxes, carnauba wax, montan ester wax, rice wax and wax from scale insects are particularly a preferable.

The preparation method of the present invention comprises the step of dispersing a resin melt in an aqueous medium in a melted state without using a solvent, and is a method of neutralizing carboxyl groups in a polyester resin (A) contained in a resin melt with a basic compound and dispersing the resin melt in the aqueous medium in a melted state, and preferably a method of simultaneously performing neutralization of a carboxyl group in a polyester resin (A) with a basic compound and dispersion of a resin melt in a melted state by mixing the resin melt with an aqueous medium containing the basic compound because of its high efficiency.

Preferable examples of the method for producing a polyester resin dispersion material of the present invention include a method for producing a polyester resin dispersion material, which comprises:

(1) melt-kneading a polyester resin (A) and, if necessary, other resin components and additives such as humectants and dispersion auxiliaries using a pressure kneader, heating-type three-roll mill, or a twin screw extruder to produce a resin melt;

(2) dispersing the resin melt in a particle state in an aqueous medium, which contains a basic substance for neutralizing carboxyl groups in the polyester resin (A) and is heated to a temperature at which a melted state of the resin melt can be maintained in the form of particles, by a mechanical device, under pressure, if necessary; and (3) rapidly cooling, preferably immediately, to yield polyester resin particles.

Preferable examples of the method for producing polyester resin particles of the present invention include a method, which comprises:

(4) producing a polyester resin particle dispersion material in the same manner as described above; and (5) drying the separated polyester resin particles.

Preferable examples of the method for producing an electrophotographic spherical toner of the present invention include a method, which comprises:

(1) melt-kneading a polyester resin (A), a colorant (B) and, if necessary, additives such as charge control agents and humectants using a pressure kneader, heating-type three-roll mill, or a twin screw extruder to produce a resin melt;

(2) dispersing the resin melt in a particle state in an aqueous medium, which contains a basic substance for neutralizing carboxyl groups in the polyester resin (A) and is heated to a temperature at which a melted state of the resin melt can be maintained, by a mechanical device, under pressure, if necessary;

(3) rapidly cooling, preferably immediately, to yield a water dispersion of electrophotographic spherical toner particles;

(4) separating the electrophotographic spherical toner particles from the water dispersion; and (5) drying the separated electrophotographic spherical toner particles and optionally performing classification of the electrophotographic spherical toner particles and addition of external additives such as hydrophobic silica to yield a toner.

The aqueous medium preferably contains a basic compound for neutralizing carboxyl groups in the polyester resin (A). As the basic compound used as a neutralizer, for example, alkali compounds may be used such as sodium hydroxide, potassium hydroxide, and lithium hydroxide, and carbonates and acetates thereof; aqueous ammonia; alkylamines such as methylamine, dimethylamine, trimethylamine, ethylamine, diethylamine, and triethylamine; and alkanolamines such as diethanolamine. Among these basic compounds, aqueous ammonia is particularly preferable. In the method for producing an electrophotographic spherical toner, aqueous ammonia is used particularly preferably because it is nearly removed in the drying step, and therefore, an adverse influence is not exerted on characteristics of the toner.

The aqueous medium is a high-temperature aqueous medium which is heated and optionally pressurized. By using a heat exchanger, the aqueous medium is heated to a temperature at which the melted state of the resin melt can be maintained. Therefore, a pressure of about 1 to 20 Kg/cm$^2$ is optionally applied thereto by a pressuring device arranged in the process, thereby adjusting to a proper temperature. In the case in which the melting temperature of the resin melt is low, a pressuring device is not necessarily used. However, in the case in which the melting temperature is 100° C. or higher, it is necessary to apply pressure to prevent the aqueous medium from boiling.

The particle size of the polyester resin particles in the polyester resin particle material and the electrophotographic spherical toner obtained by the preparation method of the present invention can be easily controlled by factors such as (i) acid value of the polyester resin (A), (ii) kind and amount of the basic compound used for neutralization (amount based on the carboxyl group, namely, neutralization ratio), and (iii) weight ratio of the polyester resin (A) to the aqueous medium. For example, when the amount of the basic compound used for neutralization based on the carboxyl group in the polyester resin (A) is increased even if the material and conditions are the same, spherical polyester particles having a small volume-average particle size are obtained. On the other hand, when the amount of the basic compound is reduced, spherical polyester particles having a large volume-average particle size are obtained.

According to the preparation method of the present invention, as described above, it is made possible to easily control the volume-average particle size of the polyester resin particle dispersion material in a preferable range. In the case in which a polyester resin particle dispersion material used as a hot melt adhesive for nonwoven fabric, which bonds a dress material with a lining, is produced, a polyester resin particle dispersion material composed of polyester resin particles having a relatively small volume-average particle size within a range from about 0.1 to 10 μm are preferable because the adhesive strength is enhanced. In the case in which an adhesive padding material is produced, a polyester resin particle dispersion material composed of polyester resin particles having a relatively large volume-average particle size within a range from about 50 to 250 μm are preferable in view of formation of a thick adhesive layer.

In the case in which the electrophotographic spherical toner is produced by the method of the present invention, toner particles having a volume-average particle size within a range from about 3 to 20 μm are preferable. Among these toner particles, toner particles having a volume-average particle size within a range from about 4 to 8 μm are particularly preferable because an electrophotographic spherical toner having superior definition image can be obtained.

As used herein, the term "volume-average particle size" refers to a value of a 50% volume-average particle size measured by a particle size distribution measuring device sold under the trademark COULTER MULTISIZERT™ 2 (manufactured by Beckman Coulter).

According to the present invention, there is no limitation to the mechanical device for dispersing the resin melt in the aqueous medium and such representative apparatuses which are commercially available can be used such as a homogenizer sold under the trademark APV GAULIN (manufactured by GAULIN), continuous ultrasonic homogenizer (manufactured by Nippon Seiki Co., Ltd.), apparatus sold under the trademarks NANOMIZER (manufactured by Nanomizer) and MICRO FLUIDIZER (manufactured by Mizuho-Kogyo Co., Ltd.), barrel type homogenizer, sold under the trademark SLASHER (manufactured by Mitsui Mining Co., Ltd.) and a rotary continuous dispersing apparatus sold under the trademark CAVITRON (manufactured by EUROTEC LTD). Among these, the CAVITRON apparatus is most preferable.

The rotary continuous dispersing apparatus sold under the trademark CAVITRON has structures such as a stator with ring-shaped ridges with slits cut therein and a rotator with ring-shaped ridges with slits cut therein which are disposed concentrically and spaced so as to mesh with each other. With this dispersing apparatus, the resin melt and the heated aqueous medium are supplied to the central portion between the stator and the rotator, while the rotator is driven to rotate so as to drive the resin melt and the aqueous medium to flow through the slits and the clearance from the central portion toward the periphery, thereby dispersing the resin melt in the heated aqueous medium.

Next, the method which uses the rotary continuous dispersing apparatus will be described in detail below with reference to the accompanying drawings.

Figure 1:
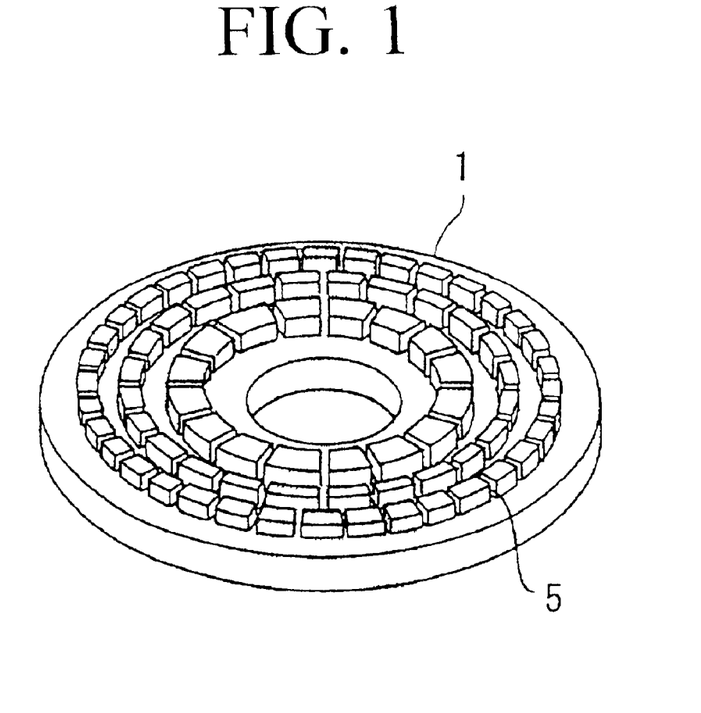
FIG. 1 is a perspective view showing an example of the stator of the rotary continuous dispersing apparatus used in the present invention.
Figure 2:
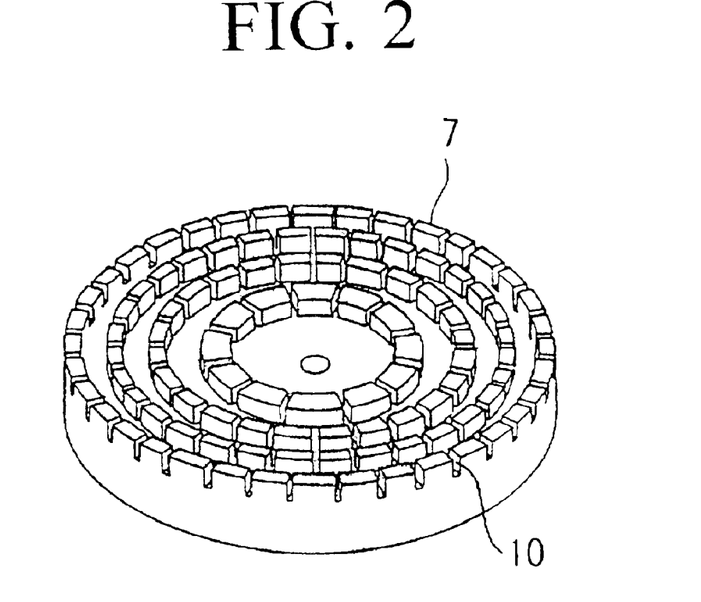
FIG. 2 is a perspective view showing an example of the rotator of the rotary continuous dispersing apparatus used in the present invention.
Figure 3:
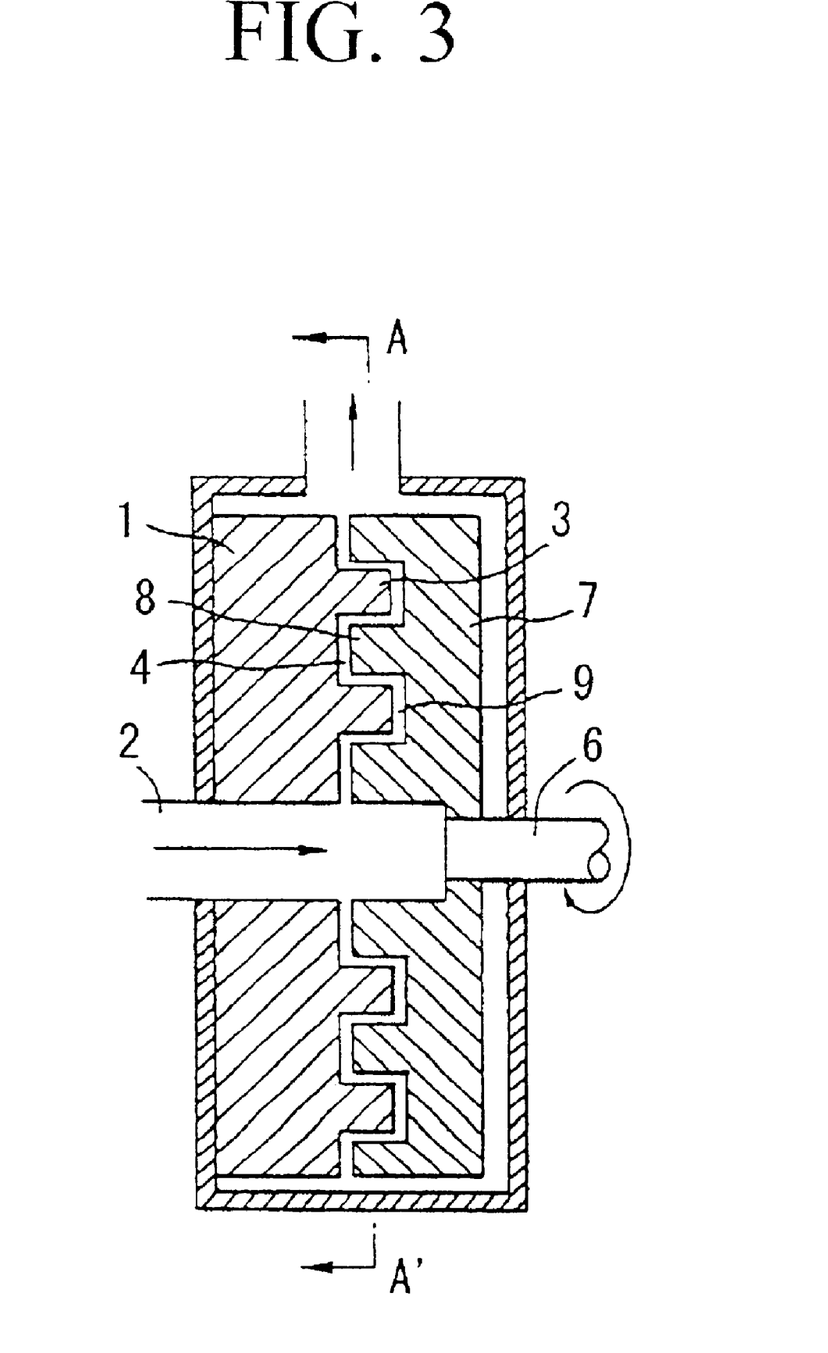
FIG. 3 is a sectional view showing an example of a key portion of the rotary continuous dispersing apparatus used in the present invention.
Figure 4:
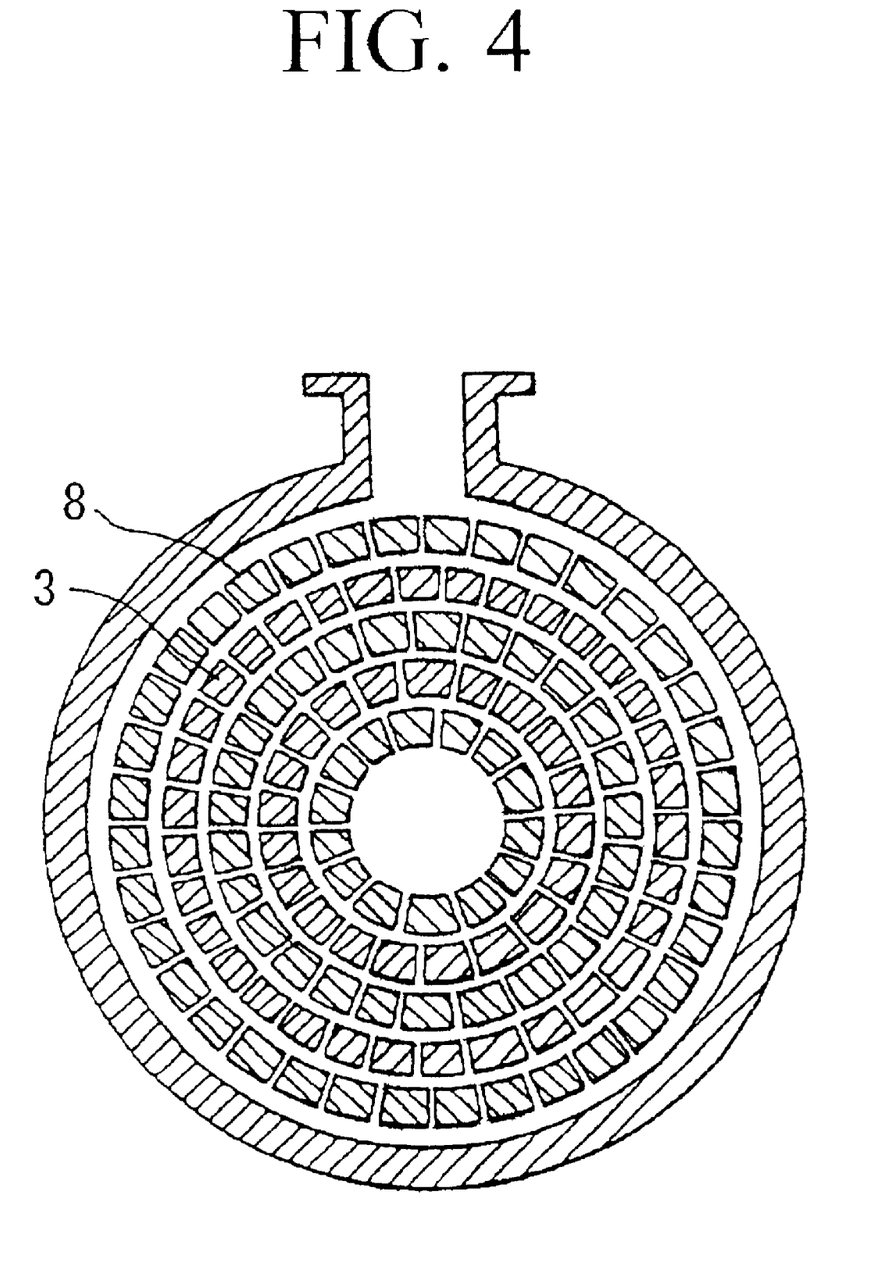
FIG. 4 shows the ridges of the stator and the ridges of the rotator being in mesh with each other, viewed sideways in the A-A' section of FIG. 3.

FIG. 1 is a perspective view showing an example of the stator of the rotary continuous dispersing apparatus which can be used in the manufacturing method of the present invention. FIG. 2 is a perspective view showing an example of the rotator of the rotary continuous dispersing apparatus which can be used in the manufacturing method of the present invention. FIG. 3 is a sectional view showing an example of a key portion of the rotary continuous dispersing apparatus used in the present invention. FIG. 4 shows the ridges of the stator and the ridges of the rotator being in mesh with each other, viewed sideways in the A-A' section of FIG. 3.

As shown in FIG. 1 to FIG. 4, the stator 1 of the rotary continuous dispersing apparatus has a liquid inlet port 2 formed at the center thereof. The stator 1 has, on the disk-shaped surface thereof, ring-shaped ridge 3 arranged in a single row or multiple rows concentrically with the stator. There is a circular groove 4 formed between the ridges. The ridge has a plurality of slits 5 cut therein.

A drive shaft 6 is installed at the center of the inner wall of the dispersing apparatus opposing the stator 1, and is connected to a drive apparatus so as to be driven thereby. A rotator 7 is fixed at the distal end of the drive shaft and is disposed parallel to the stator 1 and is concentric therewith. The rotator 7 has, on the surface thereof which opposes the stator 1, ring-shaped ridge 8 arranged in a single row or multiple rows concentrically with the rotator. There is a circular groove 9 formed between the ridges, similar to that of the stator. The ridge has a plurality of slits 10 cut therein.

The stator 1 and the rotator 7 are put into operation in such a state as to mesh with each other while maintaining a small clearance between the ridge 3 of the stator 1 and the ridge 8 of the rotator 7.

When the resin melt and the heated aqueous medium are supplied to the liquid inlet port 2 of the dispersing apparatus and the rotator 7 rotates, the mixture of the resin melt and the heated aqueous medium passes through the slits 10 of the ridge 8 located at the innermost position of the rotator 7 into the circular groove 9 from the outside of the ridge 8 of the rotator 7 by the action of the centrifugal force, and enters the slit 5 of the ridge 3 located at the innermost position of the stator 1. The mixture which has entered the slit 5 is forced into the circular groove 4 of the stator 1.

Thus the mixture liquid flows from the liquid inlet port through the slit toward the outlet port under the centrifugal force generated by the rotation of the rotator 7. Meanwhile, as the slits of the rotator 7 and the slits of the stator 1 meet and separate, flow passages for the mixture open and close alternately, thereby developing differential pressure. The mixture liquid is also subjected to a shearing force in the narrow clearance between the rotator 7 and the stator. The flow from the center toward the periphery and the flow in the circumferential direction collide at right angles, generating an intense stirring and crushing effect. This generates a dispersion material wherein the resin melt is dispersed in the form of particles in the heated aqueous medium.

Rotating speed of the rotator 7 of the dispersing apparatus is controlled by a drive motor which is connected to the drive shaft. The higher the rotating speed, that is, the higher the peripheral speed, the greater the centrifugal force and the shearing force acting on the liquid, so that the particle size of the resin melt dispersed in the aqueous medium becomes smaller. In the case in which an electrophotographic spherical toner having an average particle size of 10 μm or more is produced by using a rotator having a diameter of 10 cm, the rotating speed is preferably within a range from 3,000 to 10,000 rpm.

When using the rotary continuous dispersing apparatus described above, it is preferable to provide the dispersing apparatus with a heat insulating jacket in order to maintain satisfactory fluidity of the resin melt. The temperature in the dispersing apparatus is controlled to be constant by balancing the temperature of the resin melt, temperature of the aqueous medium being supplied, and the amount of heat generated by the shearing effect in the apparatus and maintained by the jacket.

The pressure in the dispersing apparatus is determined by the vapor pressure of the aqueous medium in the apparatus and the discharging pressure generated by the rotator which is rotating at a high speed. The cooled water dispersion containing the resin melt dispersed therein is preferably extracted continuously under atmospheric pressure while keeping the inner pressure constant by an automatic pressure control valve installed at the discharge port.

The water dispersion containing the polyester resin particles dispersed therein which is discharged from the outlet port of the rotary continuous dispersing apparatus is preferably cooled down as quickly as possible to a temperature below the glass transition temperature of the polyester resin, before the resin particles coagulate into clusters.

For the apparatus employed for rapid cool down, a commercially available heat exchanger may be used. While there is no limitation to the cooling rate, it is preferably 10° C./sec or higher in order to prevent coagulation.

When the temperature has been lowered to near the glass transition temperature of the polyester resin, the aqueous water dispersion material containing the polyester resin particles dispersed therein can be obtained by returning the pressure to the atmospheric pressure by means of a control valve.

According to the method for producing an electrophotographic spherical toner of the present invention, the electrophotographic spherical toner having desired particle size and particle size distribution can be obtained by filtering and washing with water, if necessary, the aqueous dispersion material containing polyester resin particles dispersed therein which contains a colorant (B), then dehydrating and drying, followed by classification as required similarly to the case of the crushing method. So-called external additives such as hydrophobic silica can be added to the toner.

The resin particles dispersed in the dispersion material containing polyester resin particles dispersed therein and the electrophotographic toner obtained by the method of the present invention are characterized by the spherical particle shape. In the case of the electrophotographic toner, in particular, the carrier is less likely to be contaminated compared to that obtained by the crushing method due to the spherical shape, thus providing such effects as very high durability and good fluidity. The term "spherical shape" used herein covers such shapes as that of a spheroid as well as that of true sphere; however, a true sphere is preferable in view of durability.

As used herein, the term "spherical shape" is used broadly and covers such shapes as that of a spheroid as well as that of a true sphere, as long as the shape does not have sharp points on the surface.

The particle size distribution of the resin particles dispersed in the dispersion material containing the polyester resin particles dispersed therein and the electrophotographic toner obtained by the method of the present invention is normally 1.36 or less, preferably 1.34 or less, and more preferably 1.32 or less, in terms of volume particle size as measured by the COULTER MULTISIZER™ 2 measuring device. This particle size distribution is represented by the square root of the ratio of 16% diameter to 84% diameter ($\sqrt{D16/D84}$) calculated from the volume particle size as measured by the COULTER MULTISIZER™ 2 measuring device. A "16% diameter" means a diameter such that the sum total of the weight of the particles larger than this diameter accounts for 16% of the total weight of all particles. Similarly, an "84% diameter" means a diameter such that the sum total of the weight of the particles larger than this diameter accounts for 84% of the total weight of all particles. The larger this value, the broader the particle size distribution, while a smaller value indicates a narrower particle size distribution. The fact that this value is 1.36 or less means that the particles are classified to a level which is in practice satisfactory for the toner. Thus, the resin particles dispersed in the dispersion material containing the polyester resin particles dispersed therein and the electrophotographic toner obtained by the method of the present invention have a sharp particle size distribution and does not normally require a classifying process.

A developer can be produced by incorporating a carrier into the resulting electrophotographic spherical toner and mixing them.

EXAMPLES

The following Examples and Comparative Examples further illustrate the present invention in detail, but the present invention is not limited thereto. In the following Examples and Comparative Examples, parts are by weight.

In the Examples, the measurement of the weight-average molecular weight by the GPC method was carried out by using a measuring apparatus sold under the trademark SHODEX GPC SYSTEM-21 [manufactured by SHOWA DENKO].

The melt viscosity of the resin was measured by using a measuring apparatus sold under the trademark KOHKA type flow tester CFT-500 [manufactured by Shimadzu Corporation]. The melt viscosity was measured under the conditions of a heating rate of 6° C. per minute, a load of 10 kg and a die size of 1.0 mmØ×1.0 mm. Tg was measured by a differential scanning calorimetry method (DSC method) at a heating rate of 10° C. per minute.

Example 1

In a 5 liter flask equipped with a stirrer, a thermometer, a nitrogen gas introducing tube and a rectifying column, 1728 parts of a bisphenol A ethylene oxide adduct (average addition mol number: 2.2, hydroxyl value: about 360 mg KOH/g), 384 parts of diethylene glycol and 153 parts oil trimethylolpropane were charged, and after heating to 140° C., 1414 parts of terephthalic acid was charged with stirring. The temperature was raised to 190° C. over one hour, and after confirming that the reaction system was uniformly stirred, 1.5 parts of dibutyltin oxide was charged thereinto. While distilling off water thus produced, the temperature was raised to 240° C. from 190° C. over one hour and the dehydration condensation reaction was continued at 240° C. for three hours, and furthermore, 157 parts of isophthalic acid was charged thereinto at the same temperature.

When the acid value became 6.0 mg KOH/g and the softening point as measured by a ring and ball method became 111° C., the temperature in the reaction system was reduced to 220° C. and the flow rate of a nitrogen gas to be introduced was reduced, and then 146 parts of dodecenylsuccinic anhydride was charged. The reaction was continued at the same temperature for 30 minutes to finally obtain a polyester resin having an acid value of 13.9 mg KOH/g, a weight-average molecular weight as measured by a GPC method of 86,800, a softening point as measured by a ring and ball method of 114° C., a temperature (T4) capable of achieving a melt viscosity of $1 \times 10^4$ Pa.s of 112° C., and a glass transition temperature (Tg) as measured by a DSC method of 51° C.

Assuming that any dodecenylsuccinic anhydride added causes ring opening to form a theoretical amount of carboxyl groups, a theoretical acid value of the resin becomes 14.2 mg KOH/g and the above determined value is extremely close to this value. Therefore, it is apparent that almost all of anhydrous rings are opened and that carboxyl groups formed by the ring opening reaction are not eliminated. The resulting resin is abbreviated as "polyester resin (A-1)".

The polyester resin (A-1) was heated to 150° C. to yield a resin melt, which was then transferred to a dispersing apparatus sold under the trademark CAVITRON CD 1010, manufactured by EUROTEC, LTD., at a rate of 100 g per minute. In a separate aqueous medium tank, 1.15 wt % diluted aqueous ammonia produced by diluting aqueous ammonia with a reagent deionized water was charged and was transferred, along with the resin melt, to the CAVITRON apparatus at a rate of 0.1 liters per minute while heating to 120° C. using a heat exchanger. The neutralization ratio of the carboxyl group by diluted aqueous ammonia was 270%. The polyester resin particle dispersion material at 135° C. produced under operating conditions of a rotor rotation speed of 7500 rpm and a pressure of 0.5 MPa was cooled to 45° C. over 10 seconds and was then taken out through an outlet.

Polyester particles in the polyester resin particle dispersion material were in spherical form and the solid content of the dispersion material was 59% by weight. The average particle size of the polyester particles as measured by a COULTER MULTISIZER™ 2 measuring device was 1.9 μm. The polyester particles were collected by filtration, washed with water, and were then dried to obtain powder particles. The powder particles had a T4 of 112° C. and Tg of 50° C. The resulting particles are abbreviated as "adhesive 1".

The shape of the polyester resin particles in the polyester resin particle dispersion material was determined by visual observation using a microscope (magnification: ×300) according to the following definitions (the same rules applied correspondingly to the following).

(1) Spherical shape: shape which is recognized as being nearly a true sphere by visual observation, or a shape in which 80% or more of the total number of particles is occupied by ellipsoidal particles having a ratio (a/b) [(a) is a length of major axis and (b) is a length of minor axis] of less than 2 in visual fields of a microscope (average value of ten visual fields).

(2) String shape: shape in which 20% or more of the total number of particles is occupied by ellipsoidal particles having a ratio (a/b) [a is a length of major axis and b is a length of minor axis (b)] of more than 2 in visual fields of a microscope (average value of ten visual fields).

(3) Irregular shape: crushed shape in which no fixed regularity is recognized and protruding portions exist.

The measurement results of the adhesive strength of the adhesive 1 are shown in Table 1, together with the volume-average particle size and the shape of particles. The method of producing test pieces is as follows.

An adhesive was uniformly coated on a nonwoven fabric in a coating weight of 17 g/m² and a polyester white cloth was laid on the coated surface. Then, the nonwoven fabric and the polyester white cloth were bonded by heating from the side of the white cloth using a heat sealer. The bonding was carried out at 140° C. under a pressure of 3 Kg/cm² for 8 seconds. The peel strength was evaluated by a 180° peeling method defined in JIS K-6854 (peel test method of adhesive) using a Tension type tensile testing machine. The measurement was carried out under the conditions of a temperature of 20° C. and a relative humidity of 60%. The moisture resistance was evaluated by the peel strength after test pieces after bonding were allowed to stand under constant temperature/constant humidity conditions of a temperature of 50° C. and a relative humidity of 95% or more for 10 days.

Example 2

In the same manner as in Example 1, except that 0.085 wt % diluted aqueous ammonia was used in place of 1.15 wt % diluted aqueous ammonia, polyester resin particles were obtained, and then spherical particles having an average particle size of 70 μm, a T4 of 112° C. and a Tg of 51° C. were obtained in the same manner as in Example 1. The resulting particles are abbreviated as "adhesive 2". The neutralization ratio of the carboxyl group by diluted aqueous ammonia was 20%. In the same manner as in Example 1, the measurement results of the adhesive strength of the adhesive 2 are shown in Table 1.

Comparative Example 1

In the same manner as in Example 1, except that 146 parts of dodecenylsuccinic anhydride was charged simultaneously with terephthalic acid and the reaction temperature was maintained at 240° C. in order to carry out the dehydration condensation reaction so that carboxyl groups formed by opening of anhydrous rings takes part in the esterification reaction, and furthermore, the flow rate of the nitrogen gas was increased, the reaction was carried out to obtain a comparative polyester resin having an acid value of 8.5 mg KOH/g, a weight-average molecular weight as measured by a GPC method of 91,200, a softening point as measured by a ring and ball method of 109° C., T4 of 110° C. and Tg of 43° C. The resulting polyester resin is abbreviated as "comparative polyester resin (A'-1)".

In the same manner as in Example 1, except that the polyester resin (A'-1) was used in place of the polyester resin (A-1), a polyester resin particle dispersion material was obtained and polyester resin particles having an average particle size of 25 μm, T4 of 106° C. and Tg of 43° C. was obtained in the same manner. The resulting particles were string-shaped irregular particles. The particles are abbreviated as "adhesive 1'". In the same manner as in Example 1, the adhesive strength of the adhesive 1' was measured. The results are shown in Table 1.

Comparative Example 2

In a 5 liter flask equipped with a stirrer, a thermometer, a nitrogen gas introducing tube and a rectifying column, 1728 parts of a bisphenol A ethylene oxide adduct (average addition mol number: 2.2, hydroxyl value: about 360 mg KOH/g), 384 parts of diethylene glycol, 153 parts of trimethylolpropane and 146 parts of a composition sold under the trademark "CARDURA E10" (glycidyl ester of branched fatty acid, manufactured by Shell Chemicals were charged, and after heating to 140° C., 1414 parts of terephthalic acid and 157 parts of isophthalic acid were charged with stirring. The temperature was raised to 190° C. over one hour, and after confirming that the reaction system was uniformly stirred, 1.5 parts of dibutyltin oxide was charged. While distilling off water thus produced, the temperature was raised to 240° C. from 190° C. over six hours and the dehydration condensation reaction was continuously carried out at 240° C. to obtain a polyester resin having an acid value of 5.5 mg KOH/g, a weight-average molecular weight as measured by a GPC method of 96,200, a softening point as measured by a ring and ball method of 114° C., a temperature (T4) capable of achieving a melt viscosity of $1 \times 10^4$ Pa s of 113° C., and a glass transition temperature (Tg) as measured by a DSC method of 48° C. The resulting polyester resin is abbreviated as "comparative polyester resin (A'-2)".

In the same manner as in Example 1, except that the polyester resin (A'-2) was used in place of the polyester resin (A-1), a polyester resin particle dispersion material was obtained and polyester resin particles having an average particle size of 34 μm, T4 of 111° C. and Tg of 48° C. was obtained in the same manner. The resulting particles were string-shaped irregular particles. The particles are abbreviated as "adhesive 2'". In the same manner as in Example 1, the adhesive strength of the adhesive 2' was measured The results are shown in Table 1.

|  | Examples | | Comp. Examples | |
|---|---|---|---|---|
| Items | 1 | 2 | 1 | 2 |
| Adhesive used | Adhesive 1 | Adhesive 2 | Adhesive 1' | Adhesive 2' |
| Volume average particle size (μm) | 1.9 | 70 | 25 | 34 |
| Shape of particles | spherical | spherical | string-shaped | string-shaped |

-continued

|  | Examples | | Comp. Examples | |
|---|---|---|---|---|
| Items | 1 | 2 | 1 | 2 |
| Peel strength (N/5 cm) | | | | |
| Initial | 23.7 | 21.1 | 11.7 | 9.8 |
| After moisture resistance test | 19.0 | 18.2 | 7.3 | 6.2 |

Examples and Comparative Examples of electrophotographic spherical toners are shown below. The shape of toner particles was judged by the same criteria as those in the case of the shape of the above polyester resin particles for adhesive.

Example 3

In a 1 liter flask equipped with a stirrer, thermometer, a nitrogen gas introducing tube and a rectifying column, 256.9 parts of a bisphenol A ethylene oxide adduct, 140.2 parts of terephthalic acid, 16.6 parts of trimethylolpropane and 0.4 parts of dibutyltin oxide were charged and then stirred at 240° C. in a nitrogen flow. The reaction was monitored by a softening point test (ring and ball method) according to JIS K-2207. When the softening temperature reached 115° C. (acid value 5.8 mg KOH/g), the temperature of the reaction system was reduced to 220° C. and 16.1 parts of dedecenylsuccinic anhydride was added, and then the reaction was continued. When the softening temperature reached 117.2° C., the reaction was completed to obtain a branched polyester resin (A-3). The resulting polyester resin (A-3) was a pale yellow solid and had an acid value of 13.4 mg KOH/g, a glass transition temperature as measured by a DSC method of 61.5° C. and a weight-average molecular weight as measured by a GPC method using a polystyrene standard of 35,000.

87 Parts of the polyester resin (A-3), 10 parts of carbon black sold under the trademark BLACK PEARLS 800, (manufactured by Cabot Corporation) and 3 parts of a releasant (Carnauba wax, manufactured by NIHON WAX) were heated to 180° C. to yield a resin melt, which was then transferred to a CAVITRON CD1010 dispersing apparatus at a rate of 100 9 per minute. In a separate aqueous medium tank, 1.40 wt % diluted aqueous ammonia produced by diluting aqueous ammonia with a reagent deionized water was charged and was transferred, along with the resin melt, to the dispersing apparatus at a rate of 0.1 liters per minute while heating to 130° C. using a heat exchanger.

After operating the CAVITRON dispersing apparatus under the conditions, of a rotor rotation speed of 7500 ppm and a pressure of 6 Kg/cm$^2$, the resulting dispersion material at a temperature of 135° C. was cooled to 35° C. within 10 seconds and was then taken out. Toner particles in the dispersion material were in a spherical form and the solid content of the dispersion material was 50% by weight. The average particle size of the toner particles as measured by a COULTER MULTISIZER™ 2 measuring device was 5.6 μm, and the particle size distribution was 1.31. The raw particles for toner did not require control of the particle size for practical use. The raw particles for toner were collected by filtration, washed with water, and were then dried to obtain raw particles for toner as powders.

100 Parts of the raw particles for toner was dry-blended with 0.2 parts of hydrophobic silica sold under the trademark R-972, (manufactured by Nippon Aerosil Co., Ltd.) to obtain a spherical black toner having an average particle size of 5.6 µm. 5 Parts of the resulting black toner and 95 parts of a ferrite carrier having an average particle size of 80 µm (electrical resistance: 107 Ω.cm) were mixed at 100 rpm in a 1 liter polyethylene bottle for one hour to produce a developer. The charged amount was measured by a blow-off method charged amount measuring apparatus sold under the trademark TB-200 (manufactured by Toshiba Chemical Corporation). As a result, it was −30 µC/g.

A developer box was filled with the developer and a 200 hour forcible stirring test (durability simulation test) was carried out by driving using an external motor. After 200 hours, the charged amount was measured. As a result, it was 30 µC/g. The electrical resistance of the carrier after separating the toner by the blow-off method was 107 Ω.cm. The average particle size of the separated toner was measured. As a result, it was 5.6 µm. It has been found that this toner has excellent durability, which is less likely to cause carrier contamination, because it is in spherical form.

Using a powder tester manufactured by Hosokawa Micron Ltd., the static density (the better the fluidity of the toner, the larger the static density) was measured. This toner had a static density of 0.38.

After forming the unfixed image using the developer by a coping machine employing a selenium photosensitive drum, a fixed image was formed by gradually changing the surface temperature of a fixing roller using a printer sold under the trademark LASER SHOT 406B, (manufactured by Canon Inc.) modified so that the surface temperature of a fixing roller could be arbitrary set. Then, the presence or absence of offset development at each surface temperature was evaluated by subjecting the fixed image to a peeling test using a cellophane tape. As a result, the fixation initiation temperature of this toner was 115° C. and offset occurred at 160° C.

Comparative Example 3

In the same manner as in Example 3, except that 16.1 parts of dodecenylsuccinic anhydride was not used, a branched polyester resin (A'-3) was synthesized. The resulting polyester resin (A'-3) was a transparent solid and had a softening point of 114° C., an acid value of 7.2 mg KOH/g, a glass transition temperature as measured by a DSC method of 61.0° C. and a weight-average molecular weight as measured by a GPC method using a polystyrene standard of 33,000.

87 Parts of the polyester resin (A'-3), 10 parts of carbon black sold under the trademark BLACK PEARLS 800, (manufactured by Cabot Corporation) and 3 parts of a releasant (Carnauba wax, manufactured by NIHON WAX) were heated to 180° C. to yield a resin melt, which was then transferred to the CAVITRON CD1010 dispersing apparatus at a rate of 100 g per minute. In a separate aqueous medium tank, 0.75 wt % diluted aqueous ammonia produced by diluting aqueous ammonia with a reagent deionized water and a 0.3 wt % polyester dispersant (polyester oligomer having a weight-average molecular weight of 4,300 and an acid value of 106 mg KOH/g obtained from isophthalic acid, maleic anhydride and 1,6-hexanediol) were charged and was transferred, along with the resin melt, to the dispersing apparatus at a rate of 0.1 liters per minute while heating to 130° C. using a heat exchanger.

After operating the CAVITRON dispersing apparatus under the conditions of a rotor rotation speed of 7500 ppm and a pressure of 6 Kg/cm², the resulting dispersion material at a temperature of 135° C. was cooled to 35° C. within 10 seconds and was then taken out. Toner particles in the dispersion material were string-shaped and were not suited for use as the toner. The solid content of the dispersion material was 50% by weight.

Comparative Example 4

In the same manner as in Comparative Example 2, except that 0.75 wt % diluted aqueous ammonia and a 0.3 wt % polyester dispersant were transferred, along with the resin melt, to the CAVITRON dispersing apparatus at a rate of 0.5 liters per minute while heating to 130° C. using a heat exchanger, a dispersion of toner particles was taken out. Toner particles in the dispersion material were in a spherical form and the solid content of the dispersion material was 16% by weight. The average particle size of the toner particles as measured by a COULTER MULTISIZER™ 2 measuring device was 6.5 µm, and its particle size distribution was 1.40. The raw particles for toner required control of the particle size for practical use. The raw particles for toner were collected by filtration, washed with water, dried, and then classified to obtain raw particles for toner as powders.

In the same manner as in Example 3, except that the raw particles for toner were used, a spherical black toner having an average particle size of 6.5 µm was obtained. In the same manner as in Example 3, except that this black toner was used, a developer was produced. As a result, the charged amount was −29 µC/g, the charged amount after 200 hours was −29 µC/g, the electrical resistance of the carrier after separating the toner by the blow-off method was 107 Ω.cm, and the average particle size of the separated toner was 6.5 µm. The static density of this toner was 0.37.

In the same manner as in Example 3, except that this developer was used, the presence or absence of offset development at each surface temperature was evaluated. As a result, the fixation initiation temperature of this toner was 130° C., and offset occurred at 160° C.

Example 4

In a 1 liter flask equipped with a stirrer, a thermometer, a nitrogen gas introducing tube and a rectifying column, 54.0 parts of ethylene glycol, 90.8 parts of neopentyl glycol, 301.4 parts of terephthalic acid, 18.6 parts of trimethylolpropane and 0.15 parts of dibutyltion oxide were charged and then stirred at 240° C. in a nitrogen flow. The reaction was monitored by a softening point test (ring and ball method) according to JIS K-2207. When the softening temperature reached 127° C. (acid value 9.5 mg KOH/g), 16.7 parts of dedecenylsuccinic anhydride was added, and then the reaction was continued. When the softening temperature reached 128.2° C., the reaction was completed to obtain a branched polyester resin (A-4). The resulting polyester resin (A-4) was a pale yellow solid and had an acid value of 17.7 mg KOH/g, a glass transition temperature as measured by a DSC method of 60.8° C. and a weight-average molecular weight as measured by a GPC method using a polystyrene standard of 47,600.

87 Parts of the polyester resin (A-4), 10 parts of carbon black sold under the trademark BLACK PEARLS 800, (manufactured by Cabot Corporation) and 3 parts of a releasant (Carnauba wax, manufactured by NIHON WAX) were heated to 175° C. to yield a resin melt, which was then transferred to a CAVITRON CD1010 dispersing apparatus at a rate of 150 g per minute. In a separate aqueous medium tank, 0.63 wt % diluted aqueous ammonia produced by diluting aqueous ammonia with a reagent deionized water was charged and was transferred, along with the resin melt, to the dispersing apparatus at a rate of 0.1 liters per minute while heating to 125° C. using a heat exchanger.

After operating the CAVITRON dispersing apparatus under the conditions of a rotor rotation speed of 7500 ppm and a pressure of 6 Kg/cm², the resulting dispersion material at a temperature of 1 30° C was cooled to 30° C. within 10 seconds and was then taken out. Toner particles in the dispersion material were in a spherical form and the solid content of the dispersion material was 60% by weight. The average particle size of the toner particles as measured by a COULTER MULTISIZER™ 2 measuring device was 5.2 μm, and its particle size distribution was 1.30. The raw particles for toner did not require control of the particle size for practical use. The raw particles for toner were collected by filtration, washed with water, and were then dried to obtain raw particles for toner as powders.

In the same manner as in Example 3, except that the raw particles for toner were used, a spherical black toner having an average particle size of 5.2 μm was obtained. In the same manner as in Example 3, except that this black toner was used, a developer was produced. As a result, the charged amount was −30 μC/g, the charged amount after 200 hours was −30 μC/g, the electrical resistance of the carrier after separating the toner by the blow-off method was 107 Ω.cm, and the average particle size of the separated toner was 5.6 μm. The static density of this toner was 0.38.

In the same manner as in Example 3, except that this developer was used, the presence or absence of offset development at each surface temperature was evaluated. As a result, the fixation initiation temperature of this toner was 115° C., and offset occurred at 180° C.

Comparative Example 5

In the same manner as in Example 4, except that 16.7 parts of dodecenylsuccinic anhydride was not used, a branched polyester resin (A'-5) was synthesized. The resulting polyester resin (A'-5) was a transparent solid and had a softening point of 126.3° C., an acid value of 11.4 mg KOH/g, a glass transition temperature as measured by a DSC method of 60.5° C. and a weight-average molecular weight as measured by a GPC method using a polystyrene standard of 45,100.

87 Parts of the polyester resin (A'-5), 10 parts of carbon black sold under the trademark BLACK PEARLS 800, (manufactured by Cabot Corporation) and 3 parts of a releasant (Carnauba wax, manufactured by NIHON WAX) were kneaded by using a twin screw extruder to yield a kneaded resin mixture, which was heated to 175° C. to yield a resin melt. The resin melt was then transferred to a CAVITRON CD1010 dispersing apparatus at a rate of 100 g per minute. In a separate aqueous medium tank, 0.91 wt % diluted aqueous ammonia produced by diluting aqueous ammonia with a reagent deionized water and a 0.3 wt % polyester dispersant (polyester oligomer having a weight-average molecular weight of 4,300 and an acid value of 106 mg KOH/g obtained from isophthalic acid, maleic anhydride and 1,6-hexanediol) were charged and was transferred, along with the resin melt, to the dispersing apparatus at a rate of 0.1 liters per minute while heating to 1 25° C. using a heat exchanger.

After operating the CAVITRON dispersing apparatus under the conditions of a rotor rotation speed of 7500 ppm and a pressure of 6 Kg/cm², the resulting dispersion material at a temperature of 130° C. was cooled to 35° C. within 10 seconds and was then taken out. Toner particles in the dispersion material were string-shaped and were not suited for use as the toner. The solid content of the dispersion material was 50% by weight.

Comparative Example 6

In the same manner as in Comparative Example 5, except that 0.91 wt % diluted aqueous ammonia and a 0.3 wt % polyester dispersant were transferred, along with the resin melt, to a CAVITRON dispersing apparatus at a rate of 0.5 liters per minute while heating to 125° C. using a heat exchanger, a dispersion of toner particles was taken out. Toner particles in the dispersion material were in spherical form and the solid content of the dispersion material was 16% by weight. The average particle size of the toner particles as measured by a Multisizer COULTER MULTI-SIZER™ 2 measuring device was 6.8 μm, and its particle size distribution was 1.39. The raw particles for toner required control of the particle size for practical use. The raw particles for toner were collected by filtration, washed with water, dried, and then classified to obtain raw particles for toner as powders.

In the same manner as in Example 3, except that the raw particles for toner were used, a spherical black toner having an average particle size of 6.8 μm was obtained. In the same manner as in Example 3, except that this black toner was used, a developer was produced. As a result, the charged amount was −29 μC/g, the charged amount after 200 hours was −29 μC/g, the electrical resistance of the carrier after separating the toner by the blow-off method was 107 Ω.cm, and the average particle size of the separated toner was 6.8 μm. The static density of this toner was 0.37.

In the same manner as in Example 3, except that this developer was used, the presence or absence of offset development at each surface temperature was evaluated. As a result, the fixation initiation temperature of this toner was 130° and offset occurred at 180° C.

What is claimed is:

1. A method for producing a polyester resin particle dispersion material, comprising dispersing a resin melt containing, as an essential component, a polyester resin (A) having a terminal structure in which an alkyl group having 4 to 20 carbon atoms or an alkenyl group having 4 to 20 carbon atoms is bonded to a carbon atom to which a carboxyl group is attached, or a carbon atom adjacent to this carbon atom, a portion or all of carboxyl groups in the polyester resin (A) being neutralized with a basic compound, in a heated aqueous medium in a melted state, and cooling the dispersed resin melt, wherein the polyester resin (A) is a branched polyester resin produced by ring opening reaction of an acid anhydride having a $C_{4-20}$ alkyl group or a $C_{4-20}$ alkenyl group with a hydroxyl group of a branched polyester resin (a) having a hydroxyl group at a terminal.

2. A method for producing a polyester resin particle dispersion material according to claim 1, wherein the polyester resin (A) is a branched polyester resin having a weight-average molecular weight (Mw) as measured by a GPC (gel permeation chromatography) method of 10,000 to 500,000 and an acid value of 5 to 100 mg KOH/g.

3. A method for producing a polyester resin particle dispersion material according to claim 1, wherein, a rotary continuous dispersing apparatus having a stator with ring-shaped ridges with slits cut therein and a rotator with ring-shaped ridges with slits cut therein which are disposed concentrically and spaced so as to mesh with each other is provided, the resin melt and the heated aqueous medium are supplied to the central portion between the stator and the rotator, while the rotator is driven to rotate so as to drive the resin melt and the aqueous medium to flow through the slits and the clearance from the central portion toward the periphery, thereby dispersing the resin melt in the heated aqueous medium.

4. A method for producing a polyester resin particle dispersion material according to claim 3, wherein the polyester resin (A) is a branched polyester resin having a weight-average molecular weight (Mw) as measured by a GPC method of 10,000 to 500,000 and an acid value of 5 to 100 mg KOH/g.

5. A method for producing a polyester resin particle dispersion material, comprising dispersing a resin melt containing, as an essential component, a polyester resin (A) having a terminal structure in which an alkyl group having 4 to 20 carbon atoms or an alkenyl group having 4 to 20 carbon atoms is bonded to a carbon atom to which a carboxyl group is attached, or a carbon atom adjacent to this carbon atom, a portion or all of carboxyl groups in the polyester resin (A) being neutralized with a basic compound, in a heated aqueous medium in a melted state, and cooling the dispersed resin melt, wherein neutralization of carboxyl groups in the polyester resin and dispersion of the resin melt into the aqueous medium in a melted state are carried out by using, as the polyester resin (A), a branched polyester resin having a weight-average molecular weight (Mw) as measured by a GPC method of 10,000 to 500,000 and an acid value of 5 to 100 mg KOH/g and mixing the resin melt containing the polyester resin as an essential component with the heated aqueous medium containing the basic compound.

6. A method for producing a polyester resin particle dispersion material according to claim 5, wherein the polyester resin (A) is a branched polyester resin produced by ring opening reaction of an acid anhydride having a $C_{4-20}$ alkyl group or a $C_{4-20}$ alkenyl group with a hydroxyl group of a branched polyester resin having a hydroxyl group at a terminal.

7. A method for producing polyester resin particles, comprising producing a polyester resin particle dispersion material by the method of any one of claims 1 to 6, and drying the polyester resin particle dispersion material.

8. A method for producing an electrophotographic spherical toner, comprising dispersing a resin melt containing, as an essential component, a polyester resin (A) having a terminal structure in which an alkyl group having 4 to 20 carbon atoms or an alkenyl group having 4 to 20 carbon atoms is bonded to a carbon atom to which a carboxyl group is attached, or a carbon atom adjacent to this carbon atom and a colorant (B), a portion or all of carboxyl groups in the polyester resin (A) being neutralized with a basic compound, in a heated aqueous medium in a melted state, and cooling and drying the dispersed resin melt, wherein the polyester resin (A) is a branched polyester resin produced by ring opening reaction of an acid anhydride having a $C_{4-20}$ alkyl group or a $C_{4-20}$ alkenyl group with a hydroxyl group of a branched polyester resin (a) having a hydroxyl group at a terminal.

9. A method for producing an electrophotographic spherical toner according to claim 8, wherein the polyester resin (A) is a branched polyester resin having a weight-average molecular weight (Mw) as measured by a GPC method of 10,000 to 500,000 and an acid value of 5 to 100 mg KOH/g.

10. A method for producing an electrophotographic spherical toner according to claim 8, wherein, a rotary continuous dispersing apparatus having a stator with ring-shaped ridges with slits cut therein and a rotator with ring-shaped ridges with slits cut therein which are disposed concentrically and spaced so as to mesh with each other is provided, the resin melt and the heated aqueous medium are supplied to the central portion between the stator and the rotator, while the rotator is driven to rotate so as to drive the resin melt and the aqueous medium to flow through the slits and the clearance from the central portion toward the periphery, thereby dispersing the resin melt in the heated aqueous medium.

11. A method for producing an electrophotographic spherical toner according to claim 10, wherein the polyester resin (A) is a branched polyester resin having a weight-average molecular weight (Mw) as measured by a GPC method of 10,000 to 500,000 and an acid value of 5 to 100 mg KOH/g.

12. A method for producing an electrophotographic spherical toner, comprising dispersing a resin melt containing, as an essential component, a polyester resin (A) having a terminal structure in which an alkyl group having 4 to 20 carbon atoms or an alkenyl group having 4 to 20 carbon atoms is bonded to a carbon atom to which a carboxyl group is attached, or a carbon atom adjacent to this carbon atom and a colorant (B), a portion or all of carboxyl groups in the polyester resin (A) being neutralized with a basic compound, in a heated aqueous medium in a melted state, and cooling and drying the dispersed resin melt, wherein neutralization of carboxyl groups in the polyester resin and dispersion of the resin melt into the aqueous medium in a melted state are carried out by using, as the polyester resin (A), a branched polyester resin having a weight-average molecular weight (Mw) as measured by a GPC method of 10,000 to 500,000 and an acid value of 5 to 100 mg KOH/g and mixing the resin melt containing the polyester resin and the colorant (B) as an essential component with the heated aqueous medium containing the basic compound.

13. A method for producing an electrophotographic spherical toner according to claim 12, wherein the polyester resin (A) is a branched polyester resin produced by ring opening reaction of an acid anhydride having a $C_{4-20}$ alkyl group or a $C_{4-20}$ alkenyl group with a hydroxyl group of a branched polyester resin (a) having a hydroxyl group at a terminal.

* * * * *